(12) United States Patent
Daiss et al.

(10) Patent No.: US 6,549,115 B1
(45) Date of Patent: Apr. 15, 2003

(54) VEHICLE SECURITY SYSTEM WITH ACTIVE AND PASSAGE REMOTE ACTUATION

(75) Inventors: Michael Daiss, Filderstadt (DE); Michael Geber, Bad Urach (DE); Joern-Marten Ohle, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,365

(22) Filed: Aug. 30, 1999

(30) Foreign Application Priority Data

Aug. 28, 1998 (DE) .......................... 198 39 348

(51) Int. Cl.[7] .......................... G05B 19/00; G06F 7/00; G08B 21/00; H04B 4/00; H04L 9/14
(52) U.S. Cl. .................... 340/5.31; 340/5.62; 340/10.3; 307/10.1; 180/279; 123/179.2
(58) Field of Search .............................. 340/5.61, 5.63, 340/5.64, 5.31, 10.1, 10.3, 10.5; 307/10.3, 10.5, 10.1, 10.6; 180/287, 279, 283; 123/179.2, 179.3, 179.4; 235/382, 384

(56) References Cited

U.S. PATENT DOCUMENTS

| | | | |
|---|---|---|---|
| 5,172,094 A | | 12/1992 | Stadler |
| 5,247,279 A | * | 9/1993 | Sato ........................... 340/426 |
| 5,515,036 A | * | 5/1996 | Waraksa et al. ........ 340/825.72 |
| 5,736,935 A | * | 4/1998 | Lambropoulos ....... 340/825.69 |
| 5,774,043 A | * | 6/1998 | Mizuno et al. ............ 340/426 |
| 5,869,908 A | * | 2/1999 | Moczygemba et al. .... 307/10.5 |
| 5,937,065 A | * | 8/1999 | Simon et al. .................. 380/9 |
| 6,043,752 A | * | 3/2000 | Hisada et al. .......... 340/825.31 |
| 6,140,938 A | * | 10/2000 | Flick ...................... 340/826.69 |
| 6,188,326 B1 | * | 2/2001 | Flick ...................... 340/825.69 |
| 6,236,333 B1 | * | 5/2001 | King ...................... 340/825.31 |

FOREIGN PATENT DOCUMENTS

| | | |
|---|---|---|
| DE | 44 14 734 C2 | 10/1996 |
| DE | 195 31 219 C1 | 12/1996 |
| DE | 40 27 491 C2 | 2/1997 |
| EP | 0787875 | 8/1997 |
| EP | 0937844 | 8/1999 |
| GB | 2305216 | 4/1997 |
| GB | 2305285 | 4/1997 |
| GB | 2306573 | 5/1997 |
| JP | 11-141211 | 5/1999 |

OTHER PUBLICATIONS

B. Preimer, Kleines Wunder—Vorstellung Mercedes S–Klasse [Minor miracle—Introduction to the Mercedes S–Class], Auto Motor Sport, 15/1998, p 16.
European Search Report.

* cited by examiner

Primary Examiner—Brian Zimmerman
Assistant Examiner—Nam Nguyen
(74) Attorney, Agent, or Firm—Crowell & Moring LLP

(57) ABSTRACT

A vehicle security system has an access monitoring device which includes an access control part and/or an electronic immobilizing device which comprises an immobilizer control part, located on the vehicle. An authentication device can be carried by the user for actuation, subject to authentication, of the respective control part on the vehicle via an associated wireless actuation communication channel. Both an actuation communication channel which needs a key, and a wireless actuation communication channel which needs no key (and communicates based on proximity, without manual actuation) are provided for actuating a control part on the vehicle, optionally via one or the other actuation communication channel. The actuation communication channel which requires a key is given priority over the corresponding actuation communication channel which needs no key.

6 Claims, 1 Drawing Sheet

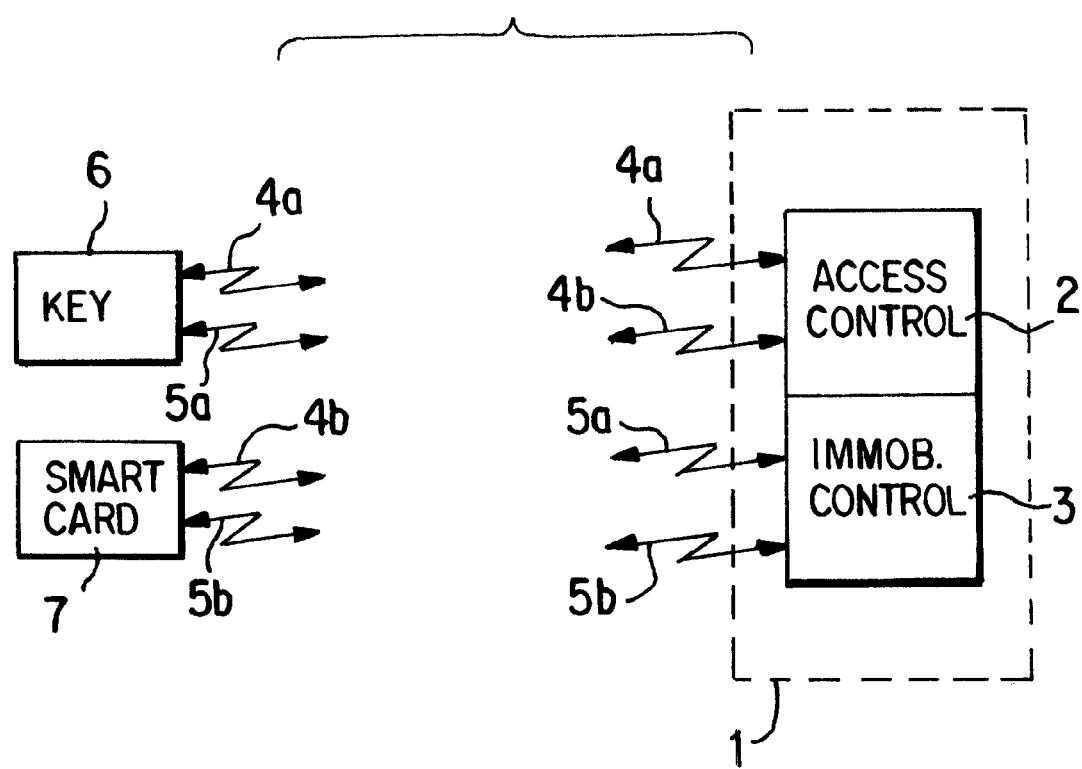

VEHICLE SECURITY SYSTEM WITH ACTIVE AND PASSAGE REMOTE ACTUATION

BACKGROUND AND SUMMARY OF THE INVENTION

This application claims the priority of Germany patent document 198 39 348.2, filed Aug. 28, 1998, the disclosure of which is expressly incorporated by reference herein.

The invention relates to a vehicle security system have a remotely operable vehicle access unit.

Such security systems are used, for example, in cars, in order to allow access to and/or use of the vehicle only by authorized vehicle operators, who use the authentication elements to request desired control measures of the access monitoring device or of the electronic immobilizing device via a wireless actuation communication channel, and to verify themselves as authorized for this purpose. Actuation of the control part of the access monitoring device and/or of the electronic immobilizer on the vehicle side is carried out subject to authentication.

Electronic keys based on systems with mechanical keys are commonly used as authentication elements for such wireless actuation communication channels. (See, for example, German Patent Document DE 195 31 219 C1.) In this case, the term "electronic key" should primarily be understood to mean those authentication elements which communicate without wires and in which action of the authentication element itself is required to carry out the authentication process. For example, a respective authentication communication process is initiated by operating a button or the like which is arranged on the electronic key, or by inserting the key in a key holder on the vehicle.

In order to avoid the need for the use of a key, so-called "keyless-go" systems with associated actuation communication channels without keys have been increasingly proposed recently, for use in place of systems with electronic keys and the associated wireless actuation communication channels with a key. The term keyless-go systems in this case means those security systems in which the authentication element itself requires no special action to carry out the authentication communication processes. Smart cards and transponders are used, in particular, as authentication elements for such systems, which vehicle users need only carry with them. See, for example, B. Priemer, Kleines Wunder— Vorstellung Mercedes S-Klasse [Minor miracle— Introduction to the Mercedes S-Class], Auto Motor Sport, 15/1998, page 16.

Various procedures are known for the user to request a desired control measure using a keyless-go system. For example, there are systems in which an authentication communication is initiated automatically without any further action by the user when he or she enters the effective area of the relevant actuation communication channel, carrying an authentication element. (That is, enters the area in which communication processes can be carried out effectively between the authentication element and the security control part on the vehicle side). Alternatively, systems are known in which an authentication communication process takes place via a control element arranged in the vehicle, or via a voice input with a request from a user. See German Patent Documents DE 40 27 491 C2 and DE 44 14 734 C2.

One object of the invention is provide a vehicle security system of the type mentioned initially, which allows a high degree of convenience of use and for which a high level of acceptance can be expected.

This and other objects and advantages are achieved by the vehicle security system according to the invention, in which a keyless-go system is combined in an advantageous manner with a system based on electronic keys. With both subsystems thus provided in parallel, the user can optionally actuate the security system via the communication channel of the subsystem which operates with electronic keys, or via the communication channel of the keyless-go subsystem (which needs no key). By providing the option of being able to actuate the security system using electronic keys, it is possible to achieve a high level of acceptance, since such systems are already in widespread use. On the other hand, the present system offers the user the option of making use of the increased convenience of using a keyless-go system.

As a result of the special combination of the two subsystems which, in principle, gives the actuation communication channel with a key priority over the actuation communication channel without a key, the vehicle user does not himself or herself need to worry any more about any changeover between the two subsystems. In fact, in operation, the security system in principle accepts both the actuation commands initiated via the one actuation communication channel and those via the other actuation communication channel, at any time, and processes these commands using the above priority principle. This means that the actuation commands emitted via an electronic key are normally obeyed immediately, or in any case after a suitable delay, provided that the present vehicle situation allows, while an actuation command entered via the communication channel without a key is obeyed only if there is no actuation command from the subsystem with a key colliding with it.

One embodiment of the invention includes an advantageous type of prioritization for the vehicle locking function carried out by the associated access monitoring device. The chosen prioritization ensures that a user who is used to electronic keys can lock the vehicle, on leaving it, using his or her electronic key in the normal manner. The system obeys this request, even if there is any contradictory unlocking command via the keyless-go subsystem. This is useful in particular when the keyless-go subsystem automatically initiates appropriate locking or unlocking commands when an associated, valid authentication element is located in the effective area of the relevant actuation communication channel without a key.

According to another feature of the invention, the electronic immobilizing device includes a conventional key holder on the vehicle side, into which a valid electronic key can be introduced for the user to actuate the immobilizer. Thereafter, an authentication communication is carried out, generally automatically; if it is successful, the immobilizer is disarmed. In a development of this device, it is now proposed that the actuation communication channel without a key is kept deactivated for as long as an electronic key (identified as being valid) is located in the key holder. In consequence, a user who is used to electronic keys can, if he or she wants, operate the vehicle as usual with his or her key without being influenced by actions from the keyless-go subsystem. On the other hand, he or she can make use of the high level of convenience in use of the keyless-go subsystem by not introducing an electronic key into the key holder, but by carrying the authentication element of the keyless-go subsystem on his or her person.

Another embodiment of the invention offers an advantageous transitional measure from the keyless-go subsystem to the subsystem with a key while the vehicle is being operated. That is, once the user has introduced a valid electronic key into the key holder when the vehicle engine is running, and the key is in the ignition-off position, the engine is not switched off until the vehicle is stationary.

Finally, still another embodiment of the invention offers a high level of convenience in that both an electronic key and an authentication element which involves no action for the keyless-go subsystem are integrated into a common, combined authentication element. Each authorized system user then needs to carry only a single authentication element with him or her, which can be used both as an electronic key and as a keyless-go authentication element which involves no action.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic block diagram of a vehicle security system having an access monitoring device and an electronic immobilizer.

DETAILED DESCRIPTION OF THE INVENTION

The vehicle security system which is illustrated schematically in the FIGURE has a first subsystem in the form of an access monitoring device, and a second subsystem in the form of an electronic immobilizing device. Where they are not described in more detail in the following text, the components of these subsystems are of conventional construction and are connected to one another in a conventional manner. The part 2 of the access monitoring device which is accommodated in the vehicle 1 thus has, in particular, an access control unit and locking units (which can be actuated via this unit) for the vehicle doors and a tailgate, while the part 3 of the electronic immobilizer on the vehicle side contains an immobilizer control unit which actuates components that are required to operate the vehicle, for example by means of switching elements for switching the ignition on and off and for starting the engine. The two control parts 2, 3 on the vehicle may be designed as separate units or may be integrated in a single controller.

Characteristically, two wireless actuation communication channels 4a, 4b, 5a, 5b for actuation subject to authentication are optionally provided via an electronic key 6 or a smart card 7, in each case both for the access control unit 2 and for the immobilizer control unit 3. Alternatively, a different conventional authentication element which involves no action can be provided instead of the smart card 7. It is self-evident that, in general, there may be a plurality of electronic keys 6 and smart cards 7 for a plurality of authorized vehicle users. For example, an authorized user may optionally actuate the access monitoring device via an electronic key 6 and the associated access monitoring actuation communication channel 4a (which needs a key), or via a smart card 7 and the associated access monitoring actuation communication channel 4b (which needs no key). He or she can also actuate the electronic immobilizer via an electronic key 6 and the associated immobilizing actuation communication channel 5a (which also needs a key), or via a smart card 7 and the associated immobilizing actuation communication channel 5b (which needs no key).

While, in the case of the illustrated system, the electronic key or keys 6 on the one hand and the one or more smart cards 7 on the other hand are shown as separate units, it is of course possible to combine in each case one electronic key 6 and one smart card 7 to form a common authentication element by, for example, integrating the smart card 7 in the housing of the electronic key 6. In this case, each vehicle user need carry only a single, combined authentication element with him or her.

The user issues an actuation command via the electronic key 6 by an appropriate action using the electronic key 6 in the conventional way. That is, on the one hand, the access monitoring device is actuated by operating a control button on the key 6, and on the other hand, the electronic immobilizer is actuated by inserting the key 6 into an electronic ignition lock, and by withdrawing it.

System actuation via the smart card 7 is also carried out in an analogous manner using a conventional principle, for example by automatic emission of a control command whenever the smart card 7 enters the effective area of one of its two communication channels 4b, 5b. These effective areas may be defined, for example, by the reception range of an antenna apparatus arranged in the vehicle. For the access actuation communication channel 4b, for example, this effective area expediently extends at least over an access zone outside the vehicle, which the vehicle user must necessarily enter on approaching the vehicle, in order to enter the vehicle itself. The effective area of the immobilizing actuation communication channel 5b of the smart card 7, on the other hand, extends at least into the vehicle interior over the area in which vehicle occupants may be seated or may keep the smart card 7 that they carry.

Alternatively, it can be provided that when the smart card 7 enters the relevant communication channel effective area, the authentication communication process is initiated automatically only in response to a user request. For which purpose, appropriate operating elements are then provided on the vehicle, such as an unlocking and locking operating element on the outside of one or more vehicle doors for access monitoring control and/or an operating element for immobilizer actuation inside the vehicle.

In order to prevent collisions of commands from the two parallel actuation communication channels for the access monitoring device and the electronic immobilizer, the actuation communication channel 4a, 5a which requires a key has priority over the actuation communication channel 4b, 5b which requires no key in the illustrated security system. This means that normally, if the vehicle situation allows, the actuation commands via the electronic key 6 are given priority over the actuation commands via the smart card 7. A user who is used to using the electronic key 6 can thus use the security system in the way in which he or she is accustomed, without having to be disturbed by the keyless-go subsystem with the smart card 7. On the other hand, a user who would like to benefit from the high level of convenience of using the keyless-go subsystem can do so in a simple manner, simply by not using the electronic key 6. The vehicle user does not need to carry out any changeover measures whatsoever between the two subsystems. The prioritization of the actuation command channels 4a, 5a which need a key is implemented in a manner with which a person skilled in the art is familiar in the system part 2, 3 on the vehicle side and comprises, in particular, the following two measures.

In order to lock the vehicle (to change the locking unit to the locked state) by means of the access control part, a user who is standing outside the vehicle can initiate the appropriate locking command by operating his or her electronic key 6, for example by pressing a locking button there. This then also actually leads to the desired vehicle locking process irrespective of whether a valid smart card 7 may at the same time be located in the effective area of its access actuation communication channel 4b (and thus may possibly be emitting a contradictory unlocking command). Such a smart card unlocking command is ignored when the locking command is being issued by a valid electronic key 6.

For immobilizer actuation, it is provided as a prioritization measure that the keyless-go subsystem will be disabled for this purpose for as long as a valid electronic key is inserted in the electronic ignition lock. Normal, simple insertion of the electronic key in the ignition lock in this case corresponds to an ignition-off key position in which the driver authorization check is carried out, but the ignition and engine are still switched off. From this position, the key can be moved to an ignition-on position, as a result of which the ignition is switched on. On further rotation to a starter-on position, the engine is started after which the key returns to the ignition-on position.

When the vehicle has been set in operation via the keyless-go subsystem and a valid electronic key is then inserted into the ignition lock when the engine is running (that is, the key is located in the ignition-off position there), a transitional measure is envisaged as a more far reaching prioritization measure. The keyless-go subsystem is kept deactivated for as long as the key is located in the ignition lock; the switching off of the engine which is requested by the key being in the ignition-off position is not carried out until the vehicle is stationary. The latter situation may be assumed by the system, for example, when an automatic transmission shift lever is in the park position. The vehicle user can then start to operate the vehicle once again either via the actuation communication channel which needs a key, by operating the key in the ignition lock in the appropriate manner, or via the keyless-go subsystem, by withdrawing the key from the ignition lock and, if required, also operating an initiation control element for the keyless-go subsystem, in order to initiate an authentication process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle security system comprising:
    at least one of an access monitoring device having an access control part, and an electronic immobilizing device with an immobilizer control part, situated on the vehicle; and
    an authentication device which can be carried by a vehicle user for actuation, subject to authentication, of at least one control part on the vehicle via an associated wireless actuation communication channel; wherein
        said vehicle security system has both an actuation communication channel which is actuatable by at least one electronic key as authentication elements, and a wireless actuation communication channel which needs no key and is actuatable by at least one authentication element, without manual operation of the authentication element by the user, for actuating the at least one control part on the vehicle, via one or the other actuation communication channels; and
        the actuation communication channel which needs a key has actuation priority over the actuation communication channel which needs no key.

2. The vehicle security system according to claim 1, wherein an access control part on the vehicle side controls associated locking units on receiving a locking command via electronic key, even when it is in the locked state, when the locking actuation communication channel which needs no key indicates an unlocked closed state.

3. The vehicle security system according to claim 1, wherein
    an electronic immobilizing device has a key holder on the vehicle side, carries out authentication communication with an electronic key which is introduced there and, if a valid key is identified, enables driving authorization;
    insertion into the vehicle holder of a key which is identified as being valid deactivates the immobilizing communication channel which needs no key; and
    the immobilizing actuation communication channel which needs no key is kept deactivated as long as the key which has been identified as being valid is located in the key holder.

4. The vehicle security system according to claim 3, wherein
    the key holder has an ignition-off key position and an ignition-on key position; and
    when a valid key is introduced into the key holder in the ignition-off position when the vehicle engine is not running, the electronic immobilizing device switches off the vehicle engine as soon as the vehicle is stationary.

5. The vehicle security system according to claim 1 wherein an electronic key and an authentication element which involves no action by the user are integrated in a common, combined authentication element.

6. A vehicle security system, comprising:
    an active actuation communication channel for actuating a vehicle security device in response to manipulation of a first actuation element by a vehicle operator; and
    a passive actuation communication channel for actuating said vehicle security device in response to proximity of a second actuation element to the vehicle, without manipulation by the vehicle operator; wherein
        a signal transmitted by the active actuation communication channel is implemented by the vehicle security system, even in the presence of a conflicting signal from the passive communication channel, which conflicting signal is not implemented by the vehicle security system.

* * * * *